(12) United States Patent
Rieken

(10) Patent No.: US 8,401,039 B2
(45) Date of Patent: Mar. 19, 2013

(54) POINT-TO-POINT COMMUNICATIONS SYSTEMS PARTICULARLY FOR USE IN POWER DISTRIBUTION SYSTEM

(75) Inventor: David W. Rieken, St. Peters, MO (US)

(73) Assignee: Aclara Power-Line Systems, Inc., Hazelwood, MO (US)

( * ) Notice: Subject to any disclaimer, the term of this patent is extended or adjusted under 35 U.S.C. 154(b) by 564 days.

(21) Appl. No.: 12/613,217

(22) Filed: Nov. 5, 2009

(65) Prior Publication Data
US 2010/0303099 A1    Dec. 2, 2010

Related U.S. Application Data

(60) Provisional application No. 61/182,483, filed on May 29, 2009.

(51) Int. Cl.
*H04J 13/00* (2011.01)
(52) U.S. Cl. ........................................ 370/479
(58) Field of Classification Search .................. None
See application file for complete search history.

(56) References Cited

U.S. PATENT DOCUMENTS

| | | | |
|---|---|---|---|
| 3,942,170 A | 3/1976 | Whyte | |
| 3,967,264 A | 6/1976 | Whyte et al. | |
| 4,065,763 A | 12/1977 | Whyte et al. | |
| 5,278,512 A * | 1/1994 | Goldstein | 324/509 |
| 5,581,229 A | 12/1996 | Hunt | |
| 6,194,996 B1 * | 2/2001 | Okazaki et al. | 370/482 |
| 6,278,357 B1 * | 8/2001 | Croushore et al. | 375/259 |
| 6,677,757 B2 | 1/2004 | Fine et al. | |
| 2002/0130768 A1 * | 9/2002 | Che et al. | 340/310.01 |
| 2005/0048993 A1 * | 3/2005 | Ammar et al. | 455/502 |
| 2006/0222105 A1 | 10/2006 | Brown et al. | |

FOREIGN PATENT DOCUMENTS

| | | |
|---|---|---|
| AU | 41056/85 | 10/1985 |
| AU | 39266/89 | 4/1991 |

OTHER PUBLICATIONS

International Search Report and Written Opinion; PCT/US2009/063375.
P. Foord and J. Tsoucalas. Remote Meter Reading, Loading Control and Distribution System Automation Utilising SWD Technology. pp. 163-167, Aug. 6, 2002.
J. Tsoucalas. Customer Automation and SWD Technology. Electrical Engineer, Jul. 1991.

* cited by examiner

*Primary Examiner* — Brandon Hoffman
(74) *Attorney, Agent, or Firm* — Polster, Lieder, Woodruff & Lucchesi, L.C.

(57) ABSTRACT

A point-to-point communications system (20) for transmitting messages from any location (A) within a power distribution system or network (10) to any other location (B) within the network. A transceiver (12) at the one location includes a transmitter (X) that impresses a waveform ($W_R$) on a waveform ($W_G$) propagated by the network to supply power throughout the network. The transmitter is a resonant transmitter that includes a reactive load (13) which is selectively connected to and disconnected from the power distribution network. A controller (16) controls operation of the transmitter to connect and disconnect the reactive load from the network so to impress on the propagated waveform a dampened sinusoidal waveform whose characteristics represent information conveyed over the power distribution system. A receiver (Yn) at the other location receives and demodulates the dampened sinusoidal waveform to extract therefrom the information being conveyed by it.

36 Claims, 5 Drawing Sheets

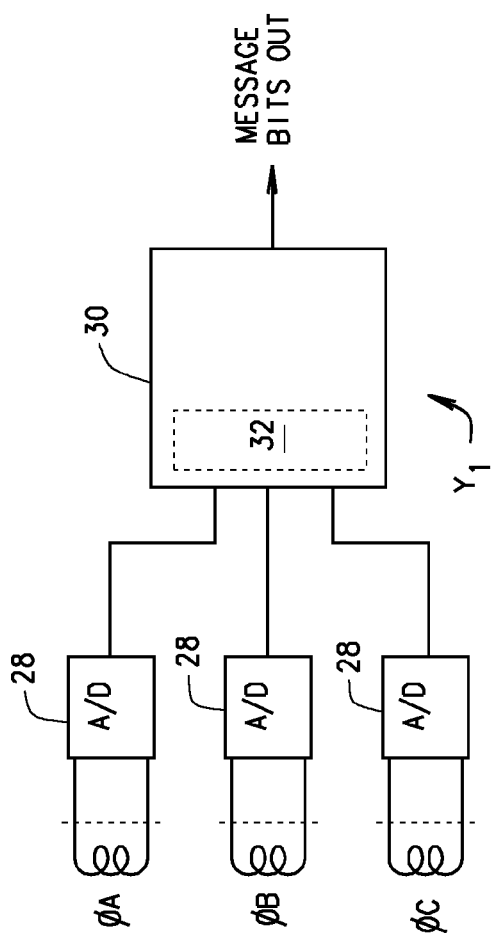
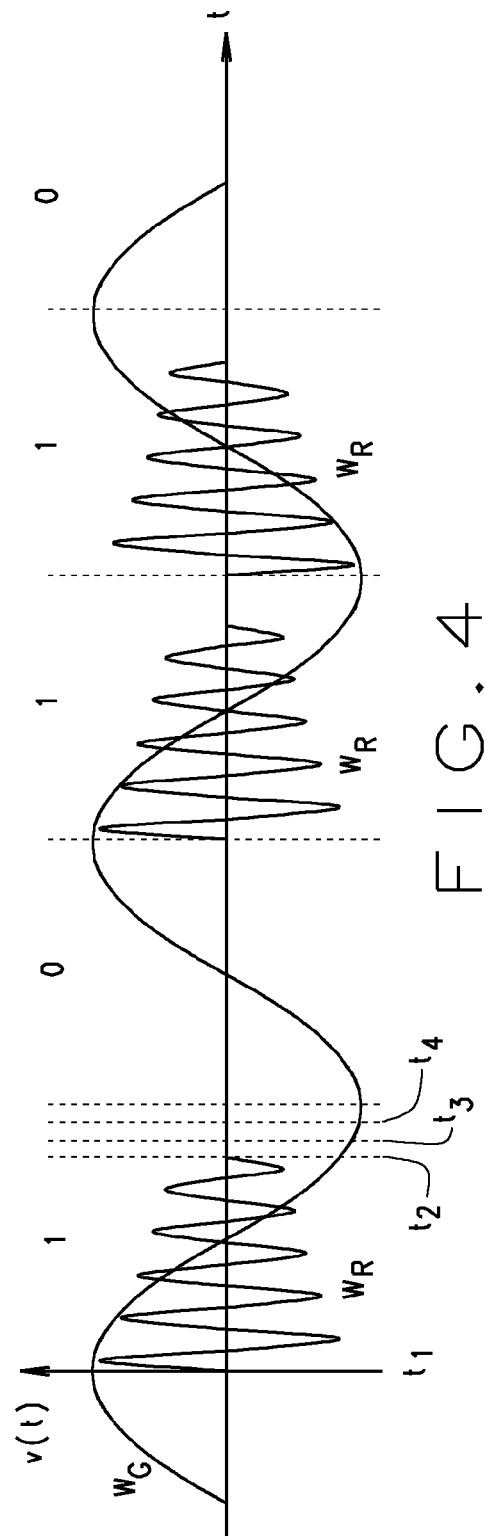

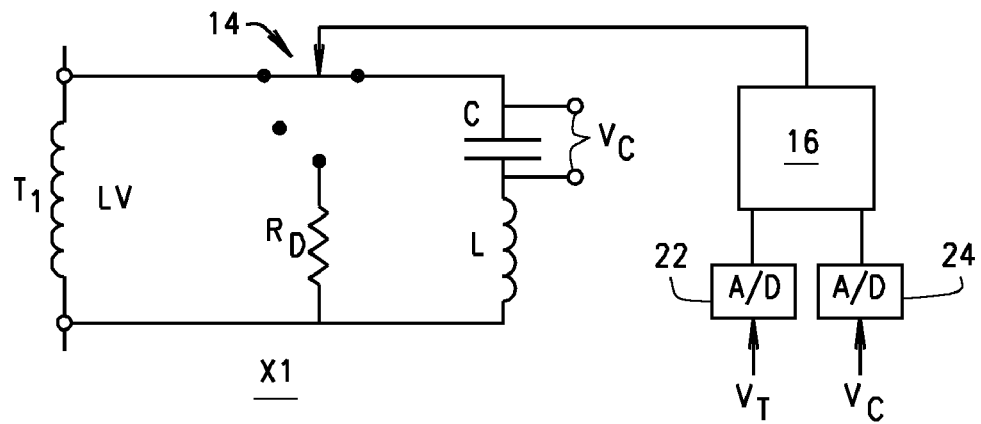
F I G. 7A
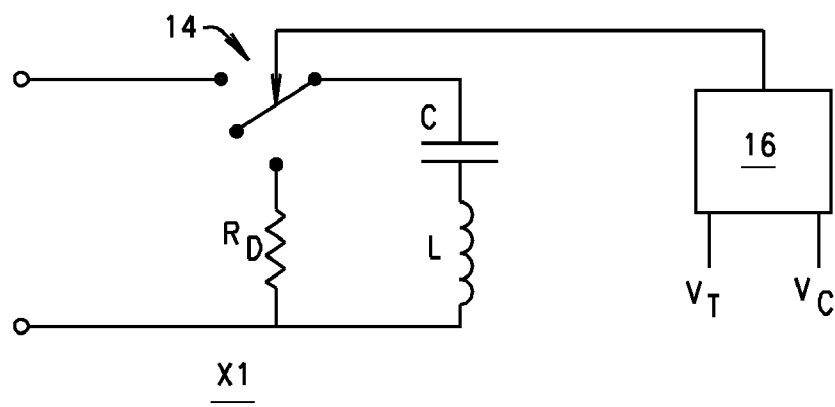
F I G. 7B
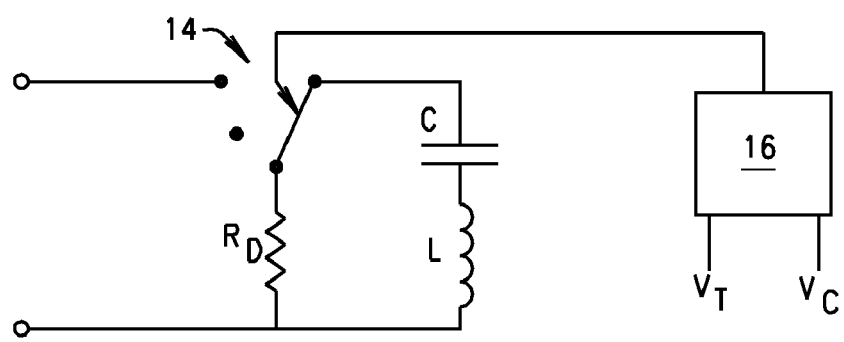
F I G. 7C

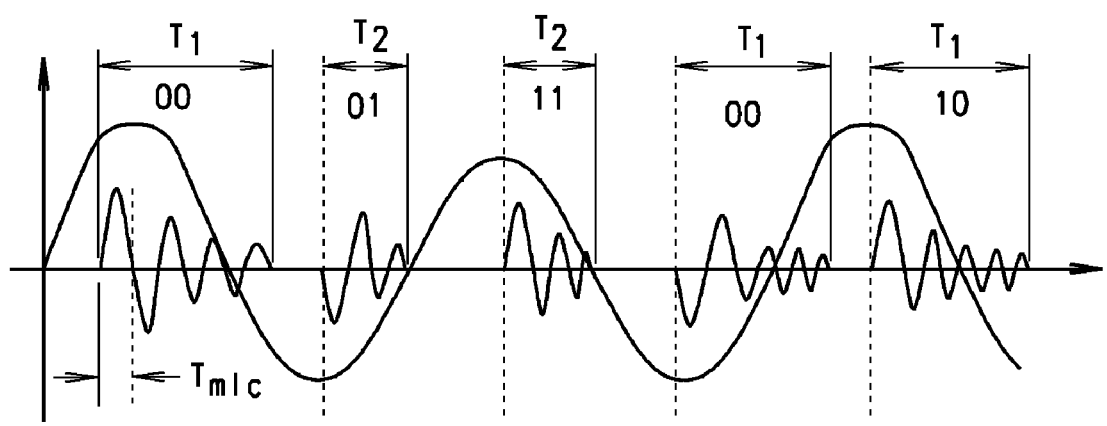
F I G. 8

POINT-TO-POINT COMMUNICATIONS SYSTEMS PARTICULARLY FOR USE IN POWER DISTRIBUTION SYSTEM

CROSS REFERENCE TO RELATED APPLICATIONS

This application claims the benefit of U.S. patent application Ser. No. 61/182,483 filed May 29, 2009, which is herein incorporated by reference.

BACKGROUND OF THE INVENTION

This invention relates to communications sent through a power distribution network; and, more particularly, to a point-to-point communications system by which information is readily transmitted from any one location within the power distribution network to any other location within the network.

Power line communications systems are known in the art. A typical system enables a utility to send messages over its power line to or from a central location such as a sub-station to most, if not all, of its customers connected to that site. The messages involve such things as current electrical usage at the customer's site, polling requests to determine whether or not an outage has occurred within a service area, or commands to reduce or shut-off the amount of power provided to a load at the customers site during periods of peak electrical usage. Replies received from the various locations to which messages are sent enable the utility to determine its current operational status, as well as changes that may need to be made to reconfigure the power distribution system for changes (or prospective changes) in its operating circumstances.

Electrical usage has grown significantly in recent years so that, over time, the demands placed on utilities has greatly increased and many utilities are now hard pressed to maintain adequate levels of service to their customers. Similarly, the demands placed on current communications systems employed by these utilities to support their operations have also greatly increased to the point where it has become difficult for these systems to timely provide the information necessary for the utility to operate at the level at which it needs to operate. For example, the amount of information required by the utility, on an almost continuous basis, has expanded to the point where the information throughput (data transmission rates) required of communications systems is at, or near the limits of the communications system's capabilities.

Installing, maintaining, and upgrading these communication systems is both time consuming and expensive. Some systems require, for example, routers, repeaters, or boosters spaced at intervals throughout the power distribution network to insure that a sufficient signal level is maintained that the transmitted information can be recovered at the receiving end. In addition, operation of some systems produces undesirable side effects which can be annoying to customers of a utility.

The present invention is directed to a point-to-point communications system that addresses these and other problems of existing communication systems.

BRIEF SUMMARY OF THE INVENTION

What is described in the present disclosure is a point-to-point communications system particularly for use with a utility's power distribution network to send communications from any one location in the network to any other location in the network.

The communications system uses transceivers located throughout the network for sending and receiving messages.

The transmitter portion of a transceiver comprises a resonant transmitter having a capacitor and inductor whose values enable the transmitter to generate a dampened sinusoidal waveform of a predetermined frequency. Generation of the waveform is controlled to provide a modulated waveform which propagates through the power distribution network in the presence of the main waveform generated by the utility. Among the modulation methods employed in the point-to-point communications system are on-off keying (OOK), phase shift keying (PSK), and quadrature amplitude modulation (QAM). A receiver portion of the transceiver receives the dampened sinusoidal waveform on some, or all three, phases ($\phi$) of the network. The receiver combines the received signals and processes the result to obtain a transmitted message.

The transceivers can be a single unit, or the transmitter and receiver portions of a unit may be separate pieces of equipment. Further, either section of a transceiver can be selectively deactivated by the user of the system.

The point-to-point communications system herein described presents significant advantages over conventional systems. For example, the resonant transmitter portion of the transceiver utilizes a reactive rather than a resistive load; and as a result, heat dissipation requirements are low. Another significant advantage is that the system of the present invention requires relatively little equipment to install and operate, and eliminating unnecessary equipment significantly lowers the cost to install, maintain, and repair the communications system. In addition, unwanted side effects caused by operation of some systems are eliminated.

Another advantage of the communications system of the present invention is that higher data transmission rates are achievable than with current systems because transmitted signals include more bits per symbol. Also, digital modulation schemes not practical for use in conventional communications systems, can now be readily employed. In addition, the ability to provide higher data transmission enables security protocols unusable in conventional systems to also be readily employed so to better protect transmissions.

It is a further advantage of the system that the dampened sinusoidal signal produced by a transceiver can be transmitted through the multiple voltage levels which occur within the network, both without the need of additional equipment, and without significant signal degradation.

In another embodiment of the invention, code division multiple access (CDMA) techniques are employed to better improve data transmission.

Other objects and features will be apparent or pointed out hereinafter.

BRIEF DESCRIPTION OF THE SEVERAL VIEWS OF THE DRAWINGS

The objects of the invention are achieved as set forth in the illustrative embodiments shown in the drawings which form a part of the specification.

FIG. 3 is a block diagram of a receiver portion of the transceiver;

FIG. 4 illustrates the generation of a dampened sinusoidal waveform using on-off keying (OOK);

FIGS. 7A-7C illustrates operation of a resonant transmitter to generate the dampened sinusoidal waveform for transmission through the utility's power distribution network together with the waveform propagated by the utility so to convey information from one location in the power distribution system to another; and, FIG. 8 illustrates generation of a dampened sinusoidal waveform using amplitude modulation.

Corresponding reference characters indicate corresponding parts throughout the several views of the drawings.

DETAILED DESCRIPTION OF INVENTION

Figure 1:
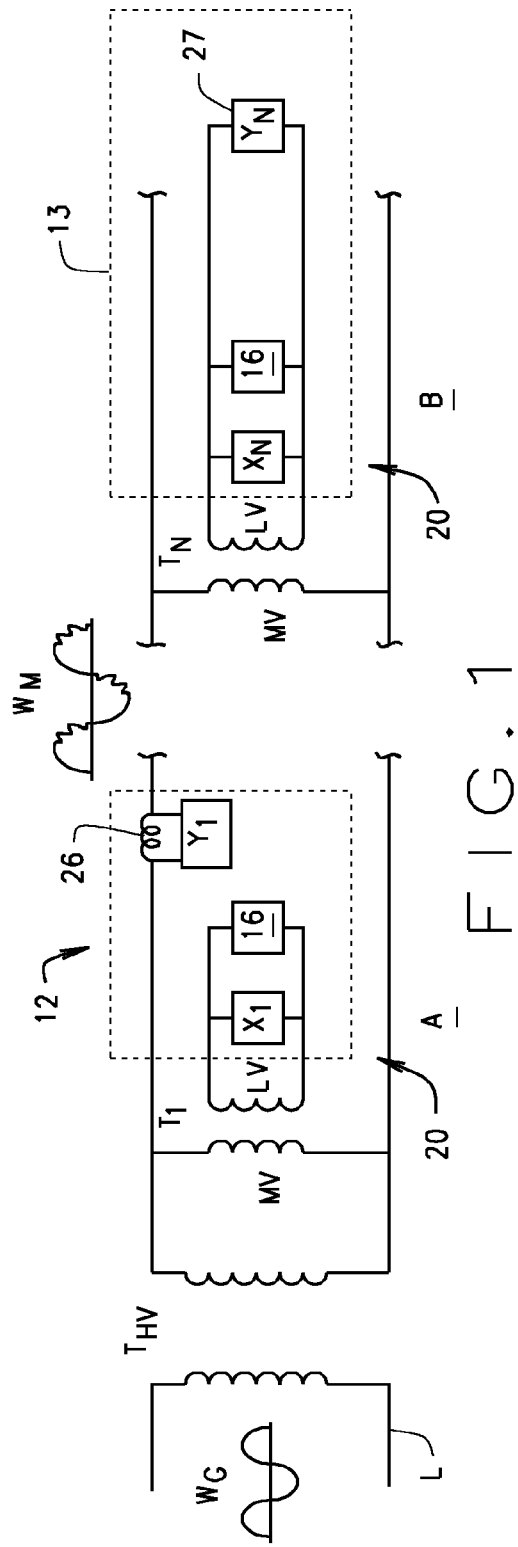
FIG. 1 is a simplified schematic of a point-to-point communications system incorporated into a utility's power distribution network.

The following detailed description illustrates the invention by way of example and not by way of limitation. This description clearly enables one skilled in the art to make and use the invention, and describes several embodiments, adaptations, variations, alternatives and uses of the invention, including what is presently believed to be the best mode of carrying out the invention. Additionally, it is to be understood that the invention is not limited in its application to the details of construction and the arrangement of components set forth in the following description or illustrated in the drawings. The invention is capable of other embodiments and of being practiced or carried out in various ways. Also, it will be understood that the phraseology and terminology used herein is for the purpose of description and should not be regarded as limiting.

Figure 6:
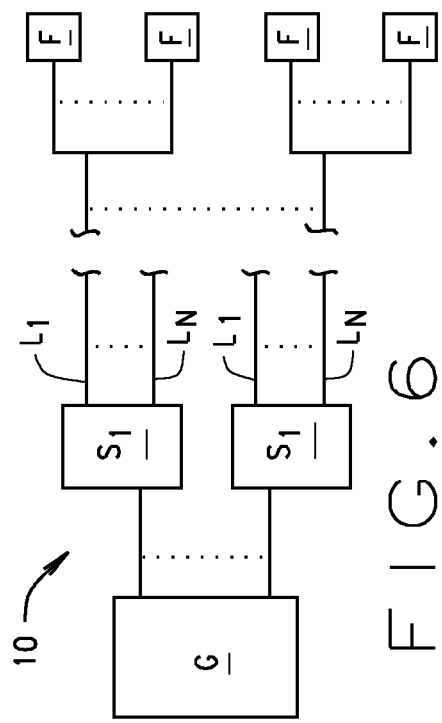
FIG. 6 is a simplified representation of a power distribution system.

Referring to the drawings, a power distribution system or network is indicated generally 10 in FIG. 6. The network includes a power generator G from which power is distributed through a plurality of substations $S_1$-$S_N$ and over power lines L1-Ln routed from each substation to the facilities F of residential, commercial, and industrial consumers. Overlying network 10 is a point-to-point communications system of the present invention which is indicated generally 20 in FIG. 1. Point-to-point communications system 20 enables messages to be transmitted from any one location A within the power distribution system to any other location B within the system. Typically, messages are sent from a substation S to one or more of the facilities F and a reply message is separately sent from each facility back to the substation. It is a feature of the present invention, however, that a message can be sent from locations other than a substation to any other location (which could be, but is not necessarily a substation) within communications system 20.

As shown in FIG. 1, a voltage waveform $W_G$ generated or propagated by the utility is impressed across the primary windings of a high voltage transformer $T_{HV}$. Waveform $W_G$ is typically a 3ϕ, 240 VAC, 60 Hz waveform; although it will be understood by those skilled in the art that communications system 20 works equally as well with other utility generated waveforms, for example, 120 VAC, 60 Hz waveforms, and the 50 Hz waveforms generated by utilities in many countries. The secondary windings of transformer $T_{HV}$ are, in turn, connected across the primary windings of transformers $T_1$-$T_N$. A transmitter X1 of a transceiver indicated generally 12 is connected across the secondary or low voltage windings LV of transformer $T_1$ at location A; while a receiver section Y1 of transceiver 12 is coupled to the power line for receiving and processing messages sent over communications system 20. At location B, a transceiver 13 includes a transmitter Xn connected across the low voltage windings of transformer $T_n$, with a receiver Yn of transceiver 13 being connected to the power line for receiving and processing messages sent over the communications system.

Figure 2:
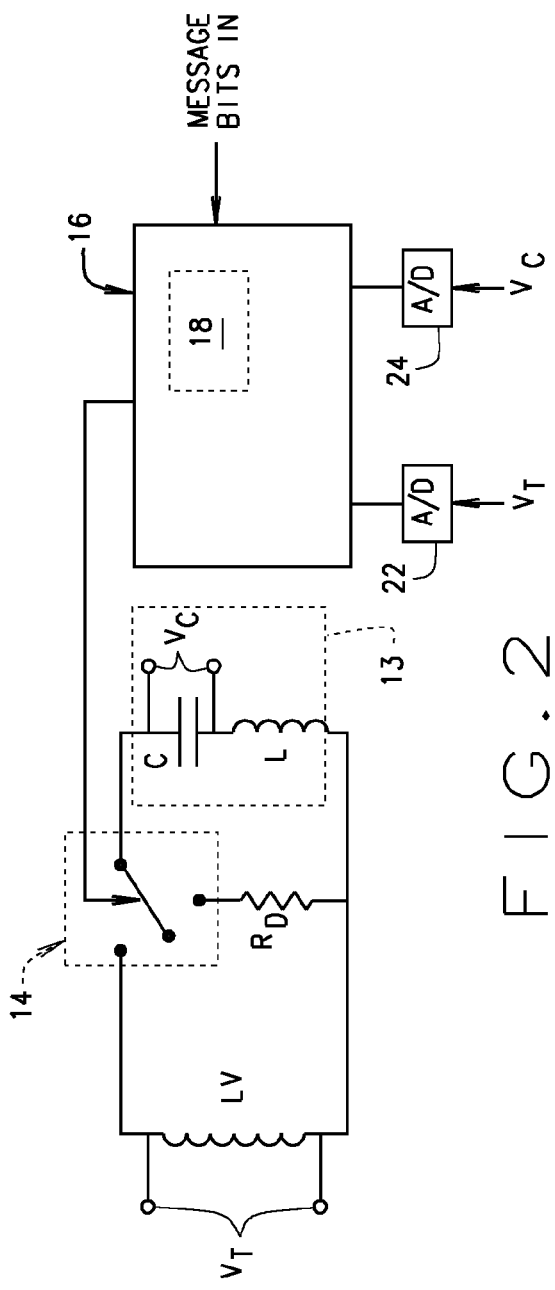
FIG. 2 is a schematic of a transmitter portion of a transceiver of the communications system.
Figure 5:
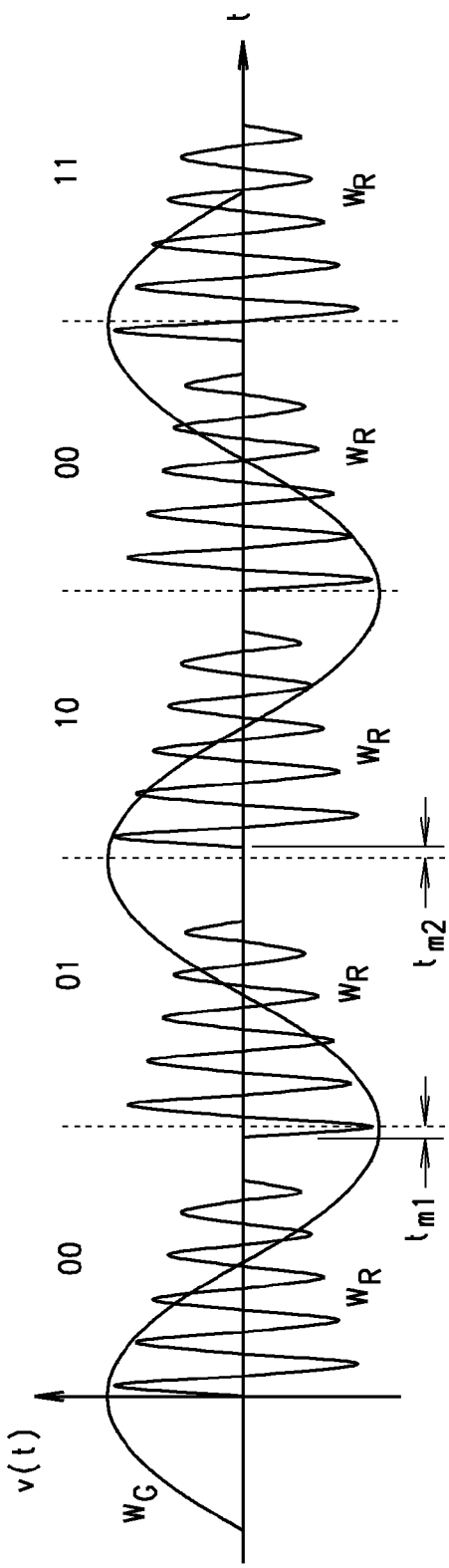
FIG. 5 illustrates generation of the dampened sinusoidal waveform using phase-shift keying (PSK)

Referring to FIG. 2, transmitter X1 includes a reactive load 13 comprised of an inductor L and a capacitor C. The values of the capacitor and inductor are chosen so transceiver 12 resonates at a desired frequency. Reactive load 13 is connected, through a switch 14, across a drain resistor $R_D$. Transmitter X1 is a resonating transmitter which, as shown in FIGS. 4 and 5, produces a dampened sinusoidal or ringing waveform $W_R$ which is now transmitted through the power distribution system together with propagated waveform $W_G$ to convey, via the resulting waveform $W_M$, information (i.e., commands or instructions, query responses, data, etc.) from location A to location B. For this purpose, switch 14 is operated in a controlled manner by a digital controller 16. In operation, controller 16 controls operation of transmitter X1 such that the characteristics of the dampened sinusoidal waveform represent the information being conveyed through the power distribution network by the resulting, modulated waveform.

Referring to FIGS. 7A-7C, controller 16 operates switch 14 in the following sequence:

First, as shown in FIG. 7A, controller 16 connects reactive load 13 of transmitter X1 to the low voltage (LV) side of transformer $T_1$ through switch 14, while drain resistor $R_D$ is isolated from both the reactive load and the transformer. This produces the dampened sinusoidal waveform $W_R$ such as shown in FIGS. 4 and 5.

Next, as shown in FIG. 7B, controller 16 operates switch 14 to isolate the reactive load and the drain resistor both from transformer $T_1$ and from each other. Isolating both the reactive load and drain resistor from transformer $T_1$ results in capacitor C holding its charge at a first predetermined charge level.

As shown in FIG. 7C, controller 16 now operates switch 14 to isolate reactive load 13 from transformer $T_1$, while placing drain resistor $R_D$ across the reactive load. This now provides a path to drain off charge from capacitor C.

Finally, controller 16 operates switch 14 to again isolate both the reactive load and drain resistor from transformer $T_1$ and from each other. Again, this is the circuit configuration shown in FIG. 7B. This switching now has the effect of letting capacitor C hold or maintain its charge at a second predetermined level.

Alternately, drain resistor $R_D$ may be omitted. When this done, the switching sequence is FIG. 7A-FIG. 7B for each signal, rather than the previously described sequence of FIG. 7A-FIG. 7B-FIG. 7C-FIG. 7B. However, the amplitude of signals as shown in FIGS. 4 and 5 will now vary from signal to signal. This is because in the previously described embodiment, drain resistor $R_D$ acted to regulate the amplitude of the signal by resetting the resonator initial conditions.

Controller 16 implements a variety of algorithms by which encoded bits representing data, instructions, etc. are sent from the one location to the other. In this regard, controller 16 utilizes a variety of channel coding schemes including, for example, a low-density parity-check (LDPC) code.

For OOK, and as shown in FIG. 4, the controller implements an algorithm by which switch 14 is operated such that one bit is transmitted for each half-cycle of the waveform $W_G$ impressed across the low voltage side of transformer T1. In operation, the generation of a resonant pulse waveform during a half-cycle of waveform $W_G$ represents a binary 1; while the absence of a resonant pulse waveform represents a binary 0. Appendix A, which is attached hereto and is incorporated herein by reference, sets forth the mathematical formulations used for OOK modulation.

Bits comprising the message to be sent from location A to location B are provided as inputs to controller 16 as shown in FIG. 2. If a binary 1 is to be transmitted, then a resonant pulse waveform is imposed on the generated waveform beginning at a time $t_1$ shown in FIG. 4, and ending at a time $t_2$. For this purpose, the algorithm implemented by controller 16 includes a phase locked loop (PLL) 18 which synchronizes timing of the resonant pulse waveform (i.e., the binary symbol) with the voltage impressed across the LV windings of transformer $T_1$.

Times $t_1$ and $t_2$ are adaptively computed using the algorithm, and the results of these computations control switching of switch 14 by controller 16. That is, they control cycling of switch 14 from its holding position shown in FIG. 7B to the conducting position shown in FIG. 7A, and then back to the holding position. For this purpose, feedback signals are supplied to controller 16 by the algorithm for use in calculating the respective modulation start and finish times. This level of operational control further has the advantage of minimizing heat dissipation and reducing or eliminating spurious electromagnetic emissions. The feedback is provided by a voltage measurement $V_T$ taken across the LV windings of transformer $T_1$, and a voltage measurement $V_C$ taken across capacitor C. The voltage measurements are applied to respective analog-to-digital (ND) converters 22, 24 whose digital outputs are supplied to controller 16.

Further referring to FIG. 4, the algorithm also adaptively computes the times $t_3$ and $t_4$. These times determine when controller 16 operates switch 14 so that the switch is switched from the holding position shown in FIG. 7B to its position shown in FIG. 7C in which capacitor C is discharged, and then back to the holding position of FIG. 7B.

Besides providing OOK, controller 16 also implements an algorithm for PSK. For this type modulation, switch 14 is operated by the algorithm so as to modulate the waveform $W_G$ impressed across the LV windings of transformer $T_1$ with one or more data bits during each interval of modulation. This produces transmissions having higher data rates than OOK. This is as shown in FIG. 5. When PSK is used by controller 16, spectral analysis of signals $V_T$ and $V_C$ is used to compute the time $t_1$ when reactive load 13 is connected to the low voltage windings of transformer $T_1$ and the time $t_2$ when it is disconnected. This is accomplished by cycling switch 14 as previously described. The result is a discrete phase shift in the resonant pulse sinusoid. Again, Appendix A sets forth the mathematical formulations used for PSK modulation.

In another embodiment, controller 16 implements an algorithm for amplitude modulation (AM). Those skilled in the art will understand that still other modulation techniques may be employed without departing from the scope of the invention. Regardless of the modulation technique employed, those skilled in the art will further understand that the characteristics of dampened sinusoid $W_R$ represents the information being conveyed over the power distribution system by the resulting modulated waveform.

In this embodiment, and referring to FIG. 8, amplitude modulation is achieved by changing the duration, and thus the energy, of the transmitted signals. Accordingly, the signals "00" and "10" are shown in FIG. 8 to have a greater amplitude than the other signals "01" and "11". The signals "00" and "10" therefore are allowed to resonate for a longer period of time; while, the signals "01" and "11" which are lower energy signals resonate for a shorter period of time. Controlled on/off switching is used, as in PSK modulation to control the sign.

Importantly, amplitude modulation and PSK can be combined to implement quadrature amplitude modulation (QAM) and thus facilitate greater rates of data transmission. Large symbol constellations are generated by changing both switch-on and switch-off times.

In addition to these techniques, the method of the present invention further utilizes code division multiple access (CDMA) in combination with OOK, PSK, or QAM in order to further improve data transmission by facilitating multiple transmitter access to a communications channel.

Receiver Y1 of transceiver 12 is, for example, a multiple input digital receiver. As shown in FIGS. 1 and 3, the receiver is connected across the medium voltage MV or low voltage LV lines of one or more of the phases using respective couplers 26 or 27. Coupler 26 is, for example, a current transformer and coupler 27 a voltage transformer. Importantly, coherently collecting the signals on all the phases of power distribution network 10, and combining and processing them, improves the fidelity of the communications sent and received using system 20.

Each input to a receiver Y is first supplied to an ND converter 28. In FIG. 3, these are shown to be connected in parallel. Importantly, receiver Y is capable of detecting and demodulating received transmissions without communications system 20 needing to use signal boosters or other ancillary equipment typically used in conventional communications systems so transmitted signals are capable of being detected. This significantly simplifies the communications process, allows for a less costly system because fewer components are required to affect communications throughout the utility's power distribution network, and also reduces costs because of the reduced amount of equipment maintenance and repair that is involved in operating communications system 20.

Digital signal outputs from the converters are provided as inputs to a signal processor 30 of the receiver which includes a PLL 32 that synchronizes the received signals with a transmitted clock signal. In this regard, every $z^{th}$ symbol transmitted by transceiver 12 at location A comprises a pilot symbol that receiver Yn at location B "knows" to expect. The algorithm used by receiver Yn now performs an adaptive equalization of received transmissions using these transmitted pilot symbols. Processor 30 then further implements the algorithm to demodulate both OOK and PSK transmissions, as well as, for example, decoding LDPC encoded communications. The decoded message is provided as an output by the receiver to an electric meter or other device at a facility F which is responsive to communications sent through system 20.

What has been described is a point-to-point communications system implemented in a utility's power distribution network by which communications are sent from anywhere within the network to anywhere else in the network. The resonant transmitter used by the communications system provides a greater data transmission capability (throughput) than conventional communications systems. The point-to-point communications system also provides greater signal clarity, eliminates RFI and light flicker problems associated with conventional communications systems, and does so while not requiring ancillary equipment such as boosters, repeaters, and the like, so to provide a rapid, high quality communications capability for a utility.

In view of the above, it will be seen that the several objects and advantages of the present disclosure have been achieved and other advantageous results have been obtained.

Having thus described the invention, what is claimed and desired to be secured by Letters Patent is:

1. In a power distribution system, a point-to-point communications system for transmitting messages from any location within the power distribution system to any other location therewithin, comprising:
   a transmitter at said any location modulating a waveform propagated through the power distribution system to supply power throughout the system, the transmitter being a resonating transmitter generating a dampened sinusoidal waveform that is transmitted through the power distribution system together with the propagated waveform;
   a controller controlling operation of the transmitter for generating a dampened sinusoidal waveform whose characteristics represent information conveyed over the power distribution system; and,
   a receiver at said any other location for receiving and demodulating the dampened sinusoidal waveform to extract from it the information being conveyed.

2. The point-to-point communications system of claim 1 in which the resonating transmitter includes a reactive load comprised of an inductor-capacitor (LC) circuit which produces the dampened sinusoidal waveform.

3. The point-to-point communications system of claim 2 in which the resonating transmitter includes a drain resistor selectively connected into the LC circuit to drain charge from the capacitor and reset the circuit between intervals of modulation of the propagated waveform.

4. The point-to-point communications system of claim 3 further including a switch by which the controller controls connection of the drain resistor into the LC circuit.

5. The point-to-point communications system of claim 3 in which a transformer is located at said any location and the resonant transmitter is located on a low voltage side of the transformer, and the controller selectively operates the switch to produce a conducting mode for the resonant transmitter in which the load is connected to the low voltage side of the transformer and generates the dampened sinusoidal waveform while the drain resistor is isolated from both the load and the transformer.

6. The point-to-point communications system of claim 5 in which the controller further isolates the load from the transformer while connecting the drain resistor to the load for draining the charge on the capacitor.

7. The point-to-point communications system of claim 1 in which the receiver includes a current transformer coupled to a power line of the power distribution system at said any other location for receiving the dampened sinusoidal waveform.

8. The point-to-point communications system of claim 1 in which the receiver includes a voltage transformer coupled located at said any other location for receiving the dampened sinusoidal waveform.

9. The point-to-point communications system of claim 1 in which the transmitter transmits the dampened sinusoidal waveform on more than one phase of the power distribution system and the receiver receives the dampened sinusoidal waveform on each phase over which it is transmitted.

10. The point-to-point communications system of claim 9 in which the receiver combines the dampened sinusoidal waveform received on each of the phases and processes the result to extract the information conveyed.

11. The point-to-point communications system of claim 10 in which the receiver includes an analog-to-digital converter for each phase over which the dampened sinusoidal waveform is received for processing of the waveform.

12. A method of point-to-point communications in a power distribution system comprising:
   impressing on a waveform propagated through the power distribution system to supply power throughout the system, a dampened sinusoidal waveform;
   controlling generation of the dampened sinusoidal waveform to produce a dampened sinusoidal waveform whose characteristics represent the information being conveyed over the power distribution system; and,
   receiving and demodulation the dampened sinusoidal waveform at a location within the power distribution system other than the location where the dampened sinusoidal waveform was produced to extract therefrom the information being conveyed.

13. The method of claim 12 in which impressing the dampened sinusoidal waveform on the propagated waveform includes operating a resonating transmitter to produce a dampened sinusoidal waveform whose characteristics represent the information being conveyed over the power distribution system.

14. The method of claim 13 in which controlling generation of the dampened sinusoidal waveform includes on-off keying (OOK) of the transmitter.

15. The method of claim 14 further including employing code division multiple access (CDMA) with on-off keying to facilitate multiple transmitter access to a communications channel.

16. The method of claim 13 in which controlling generation of the dampened sinusoidal waveform includes phase shift keying (PSK) of the transmitter.

17. The method of claim 16 further including employing code division multiple access (CDMA) with phase shift keying to facilitate multiple transmitter access to a communications channel.

18. The method of claim 13 in which controlling generation of the dampened sinusoidal waveform includes quadrature amplitude modulation (QAM) of the propagated waveform using the transmitter.

19. The method of claim 18 further including employing code division multiple access (CDMA) with quadrature amplitude modulation to facilitate multiple transmitter access to a communications channel.

20. The method of claim 13 in which the resonating transmitter includes a reactive load and is connected to the low voltage side of a transformer connected across power lines over which the propagated waveform is transmitted throughout the power distribution system, and impressing the dampened sinusoidal waveform on the propagated waveform includes: connecting the reactive load to the low voltage side of the transformer while a drain resistor is isolated from both the reactive load and the transformer so for dampened sinusoidal waveform to be generated and impressed on the propagated waveform;
   isolating both the reactive load and the drain resistor from the transformer for a capacitor of the reactive load to hold a charge at a first predetermined level;
   isolating the reactive load from the transformer and switching the drain resistor into the reactive load for draining charge from the capacitor; and,
   again isolating both the reactive load and the drain resistor from the transformer for the capacitor to hold a charge at a second predetermined level.

21. The method of claim 12 further including transmitting the dampened sinusoidal waveform on more than one phase of the power distribution system, and receiving the dampened sinusoidal waveform on each phase over which it is transmitted.

22. The method of claim 21 in which receiving the dampened sinusoidal waveform includes coupling a current transformer to a power line of the power distribution system at said any other location.

23. The method of claim 21 in which receiving the dampened sinusoidal waveform includes connecting a voltage transformer to a power line at said any other location.

24. The method of claim 21 in which demodulating the dampened sinusoidal waveform includes combining the dampened sinusoidal waveform received on each of the phases and processing the result to extract the information conveyed.

25. The method of claim 24 further including performing an analog-to-digital conversion of the dampened sinusoidal waveform received on each phase and combining the results of the conversion.

26. A method of point-to-point communications in a power distribution system comprising:
propagating a waveform through the power distribution system to supply power throughout the system;
modulating the propagated waveform with a dampened sinusoidal waveform the characteristics of which define information to be conveyed throughout the power distribution system, modulating the waveform including impressing the dampened sinusoidal waveform on the propagated waveform using a resonant transmitter; and
receiving and demodulating the resultant waveform at a location within the power distribution system other than the location at which the dampened sinusoidal waveform was impressed on the propagated waveform thereby to extract the information being conveyed.

27. The method of claim 26 in which the resonant transmitter includes a reactive load comprised of an inductor-capacitor (LC) circuir and a drain resistor, and the method further includes selectively switching the drain resistor into the LC circuit to drain the charge on the capacitor.

28. The method of claim 27 further including:
connecting the reactive load to one side of a transformer while the drain resistor is isolated from both the reactive load and the transformer so for dampened sinusoidal waveform to be generated and impressed on the propagated waveform;
isolating both the reactive load and the drain resistor from the transformer for the capacitor to hold a charge at a first predetermined level;
isolating the reactive load from the transformer and switching the drain resistor into the reactive load for draining charge from the capacitor; and,
again isolating both the reactive load and the drain resistor from the transformer for the capacitor to hold a charge at a second predetermined level.

29. The method of claim 28 in which impressing the dampened sinusoidal waveform includes on-off keying (OOK) of the resonant transmitter.

30. The method of claim 28 in which impressing the dampened sinusoidal waveform includes phase shift keying (PSK) of the resonant transmitter.

31. The method of claim 28 in which controlling generation of the dampened sinusoidal waveform includes quadrature amplitude modulation (QAM) of the propagated waveform using the resonant transmitter.

32. The method of claim 26 further including transmitting the dampened sinusoidal waveform on more than one phase of the power distribution system, and receiving the dampened sinusoidal waveform on each phase over which it is transmitted.

33. The method of claim 32 in which receiving the dampened sinusoidal waveform includes coupling a current transformer to a power line of the power distribution system at said any other location.

34. The method of claim 33 in which receiving the dampened sinusoidal waveform includes connecting a voltage transformer to a power line at said any other location.

35. The method of claim 33 in which demodulating the dampened sinusoidal waveform includes combining the dampened sinusoidal waveform received on each of the phases and processing the result to extract the information conveyed.

36. The method of claim 35 further including performing an analog-to-digital conversion of the dampened sinusoidal waveform received on each phase and combining the results of the conversion.

* * * * *

UNITED STATES PATENT AND TRADEMARK OFFICE
CERTIFICATE OF CORRECTION

| | | |
|---|---|---|
| PATENT NO. | : 8,401,039 B2 | Page 1 of 1 |
| APPLICATION NO. | : 12/613217 | |
| DATED | : March 19, 2013 | |
| INVENTOR(S) | : David W. Rieken | |

It is certified that error appears in the above-identified patent and that said Letters Patent is hereby corrected as shown below:

In the Specifications:

In Column 5, line 28, please delete the word "(ND)" and replace it with the word --(A/D)--.

In Column 6, line 22, please delete the word "ND" and replace it with the word --A/D--.

In the Claims:

In Column 9, line 34, please delete the word "circuir" and replace it with the word --circuit--.

Signed and Sealed this
Fourteenth Day of May, 2013

Teresa Stanek Rea
*Acting Director of the United States Patent and Trademark Office*